(12) United States Patent
Chen et al.

(10) Patent No.: US 12,091,478 B2
(45) Date of Patent: Sep. 17, 2024

(54) METAL IONOMER COMPOSITIONS AND METHODS OF MAKING THE SAME

(71) Applicant: Dow Global Technologies LLC, Midland, MI (US)

(72) Inventors: Xue Chen, Manvel, TX (US); Stephen King, League City, TX (US)

(73) Assignee: Dow Global Technologies LLC, Midland, MI (US)

( * ) Notice: Subject to any disclaimer, the term of this patent is extended or adjusted under 35 U.S.C. 154(b) by 404 days.

(21) Appl. No.: 17/615,762

(22) PCT Filed: May 20, 2020

(86) PCT No.: PCT/US2020/033706
§ 371 (c)(1),
(2) Date: Dec. 1, 2021

(87) PCT Pub. No.: WO2020/247173
PCT Pub. Date: Dec. 10, 2020

(65) Prior Publication Data
US 2022/0306783 A1  Sep. 29, 2022

Related U.S. Application Data

(60) Provisional application No. 62/857,466, filed on Jun. 5, 2019.

(51) Int. Cl.
*C08F 220/06* (2006.01)
*C08F 210/02* (2006.01)

(52) U.S. Cl.
CPC .......... *C08F 220/06* (2013.01); *C08F 210/02* (2013.01); *C08F 2810/50* (2013.01)

(58) Field of Classification Search
CPC ........ C08F 220/06; C08F 210/02; C08F 6/02; C08F 8/32; C08F 8/44
See application file for complete search history.

(56) References Cited

U.S. PATENT DOCUMENTS 3,264,272 A   8/1966 Rees
3,328,367 A   6/1967 Rees
(Continued)

FOREIGN PATENT DOCUMENTS

CA    862838      2/1971
CN    107709442 A  2/2018
(Continued)

OTHER PUBLICATIONS

International Preliminary Report on Patentability for Application No. PCT/US2020/033706 issued on Dec. 7, 2021, pp. 1 to 8.
Communication pursuant to Rules 161(1) and 162 EPC, dated Feb. 2, 2022, pertaining to EP Application No. 20730938.6.
Chinese Office Action dated Sep. 22, 2023, pertaining to Chinese Patent Application No. 202080040422.5, 11 pgs.
(Continued)

*Primary Examiner* — Robert C Boyle
(74) *Attorney, Agent, or Firm* — Dinsmore & Shohl LLP

(57) ABSTRACT

Disclosed in embodiments herein are ionomers and methods of making the same. The ionomers comprise a neutralized blend of olefin-carboxylic acid copolymers and Group II, Group IIIA, and transition metal salts. The method includes mixing an acid copolymer formed from an α-olefin monomer and an α,β-ethylenically unsaturated carboxylic acid having at least one carboxylic acid group with an amine-containing aqueous solution to form an aqueous dispersion containing an amine salt of the acid copolymer. The method further includes mixing a solution of a Group IIA, Group IIIA, or transition metal salt with the aqueous dispersion containing the amine salt of the acid copolymer to exchange at least a portion of the amine salt for the Group IIA, Group IIIA, or transition metal salt, thereby forming the ionic copolymer.

9 Claims, 2 Drawing Sheets

(56) References Cited

U.S. PATENT DOCUMENTS

| | | | |
|---|---|---|---|
| 3,389,109 A | 6/1968 | Harmon et al. | |
| 3,471,460 A | 10/1969 | Rees | |
| 4,661,634 A | 4/1987 | Vaughn et al. | |
| 4,766,174 A | 8/1988 | Statz | |
| 5,206,279 A | 4/1993 | Rowland et al. | |
| 5,387,635 A | 2/1995 | Rowland et al. | |
| 2009/0183773 A1* | 7/2009 | Samuels | B32B 17/10743 156/60 |
| 2011/0143620 A1* | 6/2011 | Wu | C08G 18/0814 424/78.03 |
| 2012/0088882 A1 | 4/2012 | Fan | |
| 2016/0145806 A1 | 5/2016 | Seok | |

FOREIGN PATENT DOCUMENTS

| | | |
|---|---|---|
| EP | 0054761 B1 | 3/1983 |
| EP | 0104316 B1 | 5/1983 |
| JP | S39-006810 B | 5/1964 |
| JP | S62-068505 A | 4/1987 |
| JP | H09 67437 A | 3/1997 |
| WO | 199639448 A1 | 12/1996 |
| WO | 2013001172 A1 | 1/2013 |

OTHER PUBLICATIONS

Brazilian Office Action dated Sep. 19, 2023, pertaining to BR Patent Application No. BR112021024218-0, 4 pgs.

Yano, Shinichi, "Transition metal-organic amine complex," Chemical Abstracts Service, Columbus, Ohio, retrieved from STN Database accession No. 1990:479002 abstract, XP002799673 (7 pages total).

Baranov, Yu V., et al., "Ionogenic copolymers from methacrylic acid and study of their behavior in the presence of salt additives," Chemical Abstracts Service, Columbus, Ohio, retreived from STN Database accession No. 1975:98465 abstract, XP00279967 (3 pages total).

International Search Report and Written Opinion issued by the European Patent Office acting as International Searching Authority for International Patent Application No. PCT/US2020/033706 dated Jul. 24, 2020 (17 total pages).

Chinese Office Action dated Mar. 4, 2024, pertaining to Chinese Patent Application No. 2020800404225, 6 pgs.

Japanese Office Action dated Mar. 5, 2024, pertaining to Japanese Patent Application No. 2021-571977, 8 pgs.

* cited by examiner

METAL IONOMER COMPOSITIONS AND METHODS OF MAKING THE SAME

CROSS REFERENCE TO RELATED APPLICATIONS

This application is a national stage filing of PCT Application No. US2020/247173 filed on May 20, 2020, which claims priority to U.S. Provisional Patent Application No. 62/857,466, filed on Jun. 5, 2019, the entire disclosures of which are hereby incorporated by reference.

TECHNICAL FIELD

Embodiments of the present disclosure are generally related to ionomers, and are specifically related to metal ionomers i.e., acid copolymers at least partially neutralized with Group IIA and Group IIIA metal salts.

BACKGROUND

Conventional processes for making ionomers include copolymerizing neutral non-ionic monomers with a monomer that contains a pendant acid group to produce a copolymer having acid functionalities and neutralizing with a metal salt. However, certain metal salts are only slightly soluble in solutions of the acid copolymer, thereby limiting the synthesis of many types of ionomers. Alternative processes, such as melt-mix methods, can require input of a large amount of energy to melt the polymers.

Accordingly, there is a need for alternative processes for forming metal ionomers.

SUMMARY

Disclosed in embodiments herein are metal ionomers and methods of making the same. The metal ionomers comprise a neutralized blend of olefin-carboxylic acid copolymers and Group II, Group IIIA, or transition metal salts. The method includes mixing an acid copolymer formed from an α-olefin monomer and an α,β-ethylenically unsaturated carboxylic acid with an aqueous solution comprising an amine-containing neutralizing agent to form an aqueous dispersion comprising an amine-neutralized ionomer. The method further includes mixing a Group IIA , Group IIIA, or transition metal salt with the aqueous dispersion containing the amine-neutralized ionomer to ion exchange at least partially the amine for the Group IIA, Group IIIA, or transition metal salt, thereby forming the metal ionomer within the aqueous dispersion.

DETAILED DESCRIPTION

Figure 1:
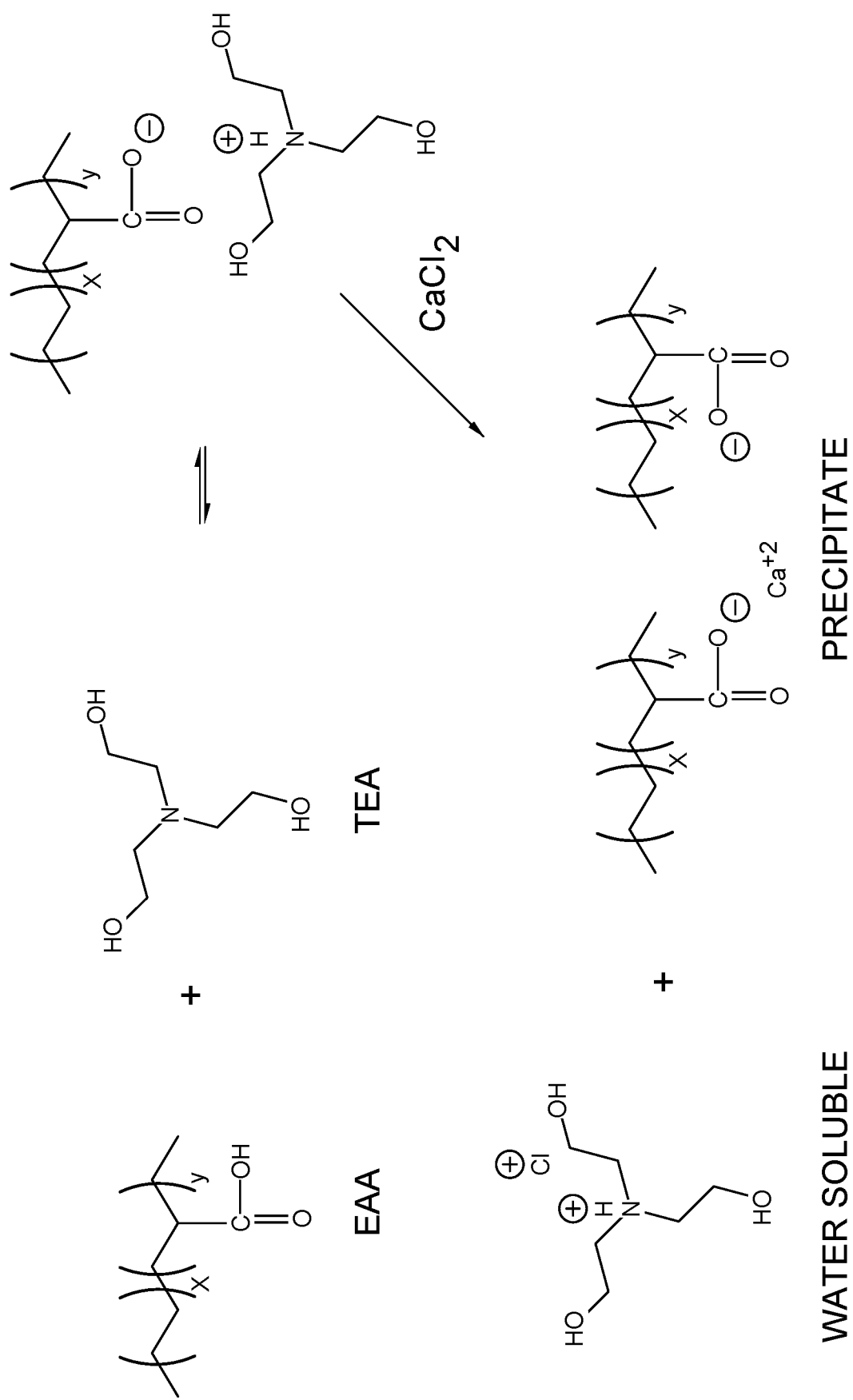
FIG. 1 is a schematic depiction of the reaction of Example 1.

Unless otherwise defined, all technical and scientific terms used herein have the same meaning as commonly understood by one of ordinary skill in the art to which this disclosure belongs. In case of conflict, the specification, including definitions, will control.

Although methods and materials similar or equivalent to those described herein can be used in the practice or testing of various embodiments, suitable methods and materials are described herein.

Unless stated otherwise, all percentages, parts, ratios, etc., are by weight. When an amount, concentration, or other value or parameter is given as either a range, preferred range, or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having," or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the disclosure. Where applicants have defined an embodiment or a portion thereof with an open-ended term such as "comprising," unless otherwise stated, the description should be interpreted to also describe such an embodiment using the term "consisting essentially of."

Use of "a" or "an" are employed to describe elements and components of various embodiments. This is merely for convenience and to give a general sense of the various embodiments. This description should be read to include one or at least one and the singular also includes the plural unless it is obvious that it is meant otherwise.

In describing certain polymers, it should be understood that sometimes applicants are referring to the polymers by the monomers used to produce them or the amounts of the monomers used to produce the polymers. While such a description may not include the specific nomenclature used to describe the final polymer or may not contain product-by-process terminology, any such reference to monomers and amounts should be interpreted to mean that the polymer comprises copolymerized units of those monomers or that amount of the monomers, and the corresponding polymers and compositions thereof.

The term "copolymer" is used to refer to polymers formed by copolymerization of two or more monomers. Such copolymers include dipolymers consisting essentially of two copolymerized monomers.

The term "acid copolymer" refers to a polymer comprising copolymerized units of an α-olefin, an α,β-ethylenically unsaturated carboxylic acid or an anhydride thereof, and optionally other suitable comonomer(s) such as, an α,β-ethylenically unsaturated carboxylic acid ester. "Ethylene acid copolymer" refers to acid copolymers comprising copolymerized units of an ethylene, and an α,β-ethylenically unsaturated carboxylic acid or an anhydride thereof, wherein at least 50 mol % is comprised of ethylene.

"(Meth)acrylic acid" includes methacrylic acid and/or acrylic acid and "(meth)acrylate" includes methacrylate and/or acrylate.

The term "ionomer" refers to a polymer that is derived from a parent acid copolymer, as disclosed above, by partially or fully neutralizing the parent acid copolymer by one or more neutralizing agents.

The term "amine-neutralized ionomer" refers to an ionomer, wherein the neutralizing agent(s) includes at least one amine.

The term "metal ionomer" refers to an ionomer, wherein all or a portion of the carboxylic acid groups of the parent acid copolymer are in the form of a metal carboxylate.

Various embodiments are directed to methods making metal ionomers including mixing an acid copolymer formed from an α-olefin monomer and an α, β-ethylenically unsaturated carboxylic acid with an aqueous solution comprising an amine-containing neutralizing agent, wherein the mixing produces an aqueous dispersion comprising an amine-neutralized ionomer having at least 20 mol % of carboxylic acid groups neutralized by the amine-containing neutralizing agent. The method further includes mixing a Group IIA, Group IIIA, or transition metal salt with the aqueous dispersion containing the amine-neutralized ionomer to at least partially ion exchange the amine for the Group IIA, Group IIIA, or transition metal salt, thereby forming the metal ionomer within the aqueous dispersion.

Conventionally, ionomers are formed by copolymerizing a neutral non-ionic monomer with a monomer that contains a pendant acid group, such as an acrylic acid or methacrylic acid. The resulting copolymer has acid functionalities that are neutralized with a metal salt. This is typically accomplished in one of two ways: neutralizing the acid with a basic metal salt via a melt-mix method; or neutralization through a solution process. In the melt-mix method, the polymers and metal salts are melted at a high temperature (e.g., greater than 400° C., depending on the metal salt) in an inert atmosphere (e.g., $N_2$), taking care not to oxidize the carboxylic acid functional group and cause color. In the solution neutralization process, the acid copolymer is dissolved and a basic salt (e.g., a hydroxide basic salt) with a metal cation is added to the solution. However, hydroxide salts of Group IIA metals (e.g., Mg, Ca, Sr, and Ba) are only slightly soluble in the acid copolymer solution, which can limit the ionomer synthesis.

Accordingly, in various embodiments, a method of forming a metal ionomer is a two-step method that enables metal salts to be used in ionomers that are otherwise limited in conventional methods because of solubility considerations, as will be described in greater detail below. Moreover, the two-step method of various embodiments described herein can be performed without the addition of large amounts of energy that may be required by conventional melt-mix methods of making metal ionomers.

In various embodiments, an aqueous dispersion of an amine-neutralized ionomer is formed by mixing an acid copolymer formed from an α-olefin monomer and an α,β-ethylenically unsaturated carboxylic acid or carboxylic acid anhydride having at least one carboxylic acid group with an aqueous solution comprising an amine-containing neutralizing agent.

The α-olefin monomer of various embodiments is a C2-C20 α-olefin monomer. Any and all ranges between C2 and C20 are included herein and disclosed herein. For example, in some embodiments, the α-olefin is a C2-C8 α-olefin. Examples of α-olefins that can be used in the various embodiments include, but are not limited to ethylene, propylene, butadiene, styrene, 1-butene, 1-pentene, 1-hexene, 1-heptene and 1-octene, and more preferably include ethylene, propylene, styrene, butadiene, or a mixture thereof. In a specific embodiment, the α-olefin monomer is ethylene.

In various embodiments, the α-olefin monomer is present in an amount of greater than 50 wt % or greater than 60 wt % based on the total weight of the monomers present in the acid copolymer. For example, the α-olefin monomer content of the acid copolymer may be from 50 wt % to 95 wt %, from 50 wt % to 90 wt %, from 50 wt % to 85 wt %, or from 60 wt % to 80 wt %.

In various embodiments, the α, β-ethylenically unsaturated carboxylic acid or carboxylic acid anhydride is an α, β-ethylenically unsaturated monomer containing at least one carboxylic acid group. In some embodiments, the α, β-ethylenically unsaturated carboxylic acid or carboxylic acid anhydride has between 3 and 8 carbon atoms. Examples of the α,β-ethylenically unsaturated carboxylic acid or carboxylic acid anhydride monomers used in various embodiments include monobasic acids, such as acrylic, methacrylic, crotonic, and acyloxypropionic acid; and dibasic acid monomers, such as maleic, fumaric, and itaconic acid. Monoesters of dibasic acids, such as monobutyl esters of maleic acid can also be used. In some particular embodiments, the α, β-ethylenically unsaturated carboxylic acid is acrylic acid, methacrylic acid, maleic anhydride, and mixtures thereof. In some particular embodiments, the acid copolymer is ethylene (meth)acrylic acid.

The α, β-ethylenically unsaturated carboxylic acid or carboxylic acid anhydride may be present in an amount of from 1 wt % to 25 wt %, from 1 wt % to 20 wt %, or from 5 wt % to 15 wt % based on a total weight of the monomers present in the acid copolymer. The acid copolymer may have a density of from 0.900 g/cc to 1.2 g/cc, 0.920 g/cc to 0.980 g/cc, from 0.930 g/cc to 0.960 g/cc, or from 0.932 g/cc to 0.958 g/cc.

Before neutralization, the acid copolymer may have a melt index ($I_2$) of less than about 2000 g/10 min, less than about 1800 g/10 min, less than about 1600 g/10 min, or even less than about 1400 g/10 min, measured in accordance with ASTM D1238 (190° C., 2.16 kg load).

In various embodiments, the acid copolymer has an acid number between about 1 and 200 mg KOH and a number average molecular weight (Mn) of from 500 to 10,000,000 g/mol, as determined by using High Temperature Gel Permeation Chromatography (PolymerChar GPC-IR). In some embodiments, the acid copolymer has a number average molecular weight (Mn) of from 500 to 5,000,000, from 500 to 1,000,000, from 500 to 500,000, from 500 to 100,000, from 500 to 50,000, from 500 to 10,000, from 500 to 5,000, from 750 to 3,000, or from 1,000 to 2,000 g/mol. Acid number is measured according to ASTM D-1386 and the stated number refers to the amount in milligrams of KOH per gram of polymer required to neutralize acid functionality of the acid copolymer when measured by titration.

The acid copolymers disclosed herein can be obtained by radical copolymerization at high temperature and high pressure. Examples of commercially available acid copolymers that can be used in some embodiments include the following ethylene acid copolymers available under the trademarks PRIMACOR™ (e.g., PRIMACOR 5890) available from SK Global Chemical Co., LTD, NUCREL™ (e.g., NUCREL™

2806) available from The Dow Chemical Company, Midland, MI, and ESCOR™ available from ExxonMobil Chemical Company.

The acid copolymer may be prepared by standard free-radical copolymerization methods, using high pressure, operating in a continuous manner. Monomers are fed into the reaction mixture in a proportion, which relates to the monomer's activity, and the amount desired to be incorporated. In this way, uniform, near-random distribution of monomer units along the chain is achieved. Unreacted monomers may be recycled. Additional information on the preparation of acid copolymers can be found in U.S. Pat. Nos. 3,264,272 and 4,766,174, each of which is hereby incorporated by reference.

In various embodiments, the acid copolymer is mixed with an aqueous solution comprising an amine-containing neutralizing agent. The amine-containing neutralizing agent may be, for example, an ammonia or an organic amine, such as, monoethanolamine (MEA), diethanolamine (DEA), triethanolamine (TEA), dimethyleaminoethanol (DMEA), or a mixture thereof. It is contemplated that other amine-containing neutralizing agents may be used, depending on the particular embodiment. For example, in some embodiments, a hydrophilic amine-containing neutralizing agent may be used. Without being bound by theory, it is believed that the use of a hydrophilic amine-containing neutralizing agent may aid in the dispersing of the acid copolymer in the solution. Moreover, in various embodiments, the particular amine-containing neutralizing agent may be selected based on the pKa of the amine-containing neutralizing agent. For example, in some embodiments, the amine-containing neutralizing agent may have a pKb of from 8 to 13, or from 9 to 12, although the particular pKb of the amine-containing neutralizing agent may vary depending on the metal salt to be incorporated into the metal ionomer.

The mixing of the acid copolymer with the amine-containing neutralizing agent may be performed via extrusion, high shear mixing, or in a reaction vessel. In some embodiments, the mixing is carried out at a temperature of from 90° C. to 150° C. Other temperatures may be used, provided that the temperature is above the melting point or above the glass transition temperature (Tg) of the polymer, to ensure that a dispersion is generated.

Upon the mixing of the acid copolymer with the amine-containing neutralizing agent, an amine-neutralized ionomer having from 5 mol % to 100 mol % of the carboxylic acid groups of the acid copolymer neutralized by the amine-containing neutralizing agent is produced. In some embodiments, at least 20 mol % of the carboxylic acid groups are neutralized by the amine-containing neutralizing agent. For example, the amine-neutralized ionomer may have from 20 mol % to 100 mol % or from 50 mol % to 100 mol % of the carboxylic acid groups neutralized by the amine-containing neutralizing agent.

In various embodiments, the resultant aqueous dispersion of amine-neutralized ionomer includes from 1 wt % to 70 wt % of the amine-neutralized ionomer, based on the total solids of the dispersion. For example, the aqueous dispersion may include from 1 wt % to 50 wt % or from 1 wt % to 30 wt % of the amine-neutralized ionomer. It should be appreciated that in various embodiments, the particular amount of the amine-neutralized ionomer in the aqueous dispersion depends on the amount of acid groups in the acid copolymer.

In various embodiments, the resulting amine-neutralized ionomer dispersion has a particle size of from 5 nm to 1000 μm, from 10 nm to 500 μm, or from 25 nm to 50 μm. Without being bound by theory, it is believed that the small particle size enables the amine-neutralized ionomer to be easily dispersed in water, and may further enable applications in which the amine-neutralized ionomer is impregnated into porous materials.

The amine-neutralized ionomer can be used to produce metal ionomers by treatment with Group IIA, Group IIIA, or transition metal salt. The metal salt replaces the amine group in the amine-neutralized ionomer to produce the metal ionomer through mixing. In some embodiments, a Group IIA or Group IIIA metal salt may be used to produce the metal ionomer. The source of the metal cations can be any convenient derivative, including but not limited to hydroxides, halides, acetates, nitrates, or sulfates. In some embodiments, the metal salt is water-soluble. As used herein, the term "water-soluble" refers to a solubility in water of greater than 1 g/L.

In various embodiments, the amine-neutralized ionomer can be treated with one or more cations of magnesium, calcium, barium, zinc, or aluminum. In some particular embodiments, the metal salt is $Mg(OH)_2$ or $Ca(OH)_2$. In embodiments, from about 10% to about 100%, from about 10% to about 80%, or from about 10% to about 55% of the total acid units of the amine-neutralized ionomer are exchanged with metal cations.

In the context of this disclosure, the percent neutralization data are presented using the assumption that each cation will react with the maximum number of carboxylic acid groups calculated from its ionic charge. That is, it is assumed, for example, that $Al^{3+}$ will react with three carboxylic acid groups, that $Mg^{2+}$ and $Zn^{2+}$ will react with two, and that $Na^+$ will react with one.

In various embodiments, the neutralization level when metal ions are used can be calculated according to the following equation:

$$\text{Neutralization Level} = \frac{\text{(metal valence)moles of metal salt}}{\text{total moles acid}} \times 100\%$$

In various embodiments, the neutralization level when caustic or amines are used can be calculated according to the following equation:

$$\text{Neutralization Level} = \frac{\text{moles of caustic or amine}(x)}{\text{total moles acid}} \times 100\%$$

Where x=1 when the amine is a monoamine (e.g, monoethanolamine), x=2 when the amine is a diamine (e.g., ethylenediamine), x=3 when the amine is trifunctional (e.g., diethylenetriamine), etc.

Alternatively or additionally, the degree of neutralization can be directly measured through established analytical methods, as described in, e.g., U.S. Pat. No. 3,328,367, or may be calculated based on the changes in the infrared absorption spectrum of the copolymer, as described in U.S. Pat. no. 3,471,460.

The blend can be produced by any means known to one skilled in the art. For example, a solution of the metal salt can be mixed with the aqueous dispersion containing the amine-neutralized ionomer at room temperature or higher and in an inert or air atmosphere in a reactor or other mixing vessel. In some embodiments, the metal salt solution can include from 0.01 wt % to 100 wt % of metal salt based on a total weight of the solution. Stirring may be used to ensure that the solution is blended with the aqueous dispersion.

The blend can additionally include small amounts of additives including plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into the blend.

These additives may be present in the blends in quantities ranging from 0.01 to 40 wt %, 0.01 to 25 wt %, 0.01 to 15 wt %, 0.01 to 10 wt %, or 0.01 to 5 wt %. The incorporation of the additives can be carried out by any known process such as, for example, by dry blending, by extruding a mixture of the various constituents, by the conventional masterbatch technique, or the like.

In various embodiments, the resulting metal ionomer comprises greater than 5 mol % metal. For example, the metal ionomer can comprise from 5 mol % to 20 mol %, or from 6 mol % to 10 mol % metal based on the total number of moles in the metal ionomer mixture.

It is contemplated that in some embodiments, the resulting dispersion including the metal ionomer can be filtered and washed with water to remove any remaining amine and/or metal salts from the metal ionomer. Other processing steps may further be included, depending on the particular embodiment.

Without being bound by theory, it is believed that the two-step process described herein enables the increased production of metal ionomers, which otherwise would be hindered due to inadequate solubility. For example, Group IIA, Group IIIA, or transition metal hydroxides, such as $Mg(OH)_2$ and $Ca(OH)_2$, have limited solubility in acid copolymer solutions. However, the salts such as $MgCl_2$, and $CaCl_2$ may be soluble in dispersion including an amine-neutralized ionomer, thereby removing the solubility constraints and increasing the amount of metal that can be incorporated into the ionomer. Additionally, various embodiments described herein enable the process to be conducted without the addition of large amounts of energy, since the dispersion of the amine-neutralized ionomer can be formed at a temperature of less than or equal to about 150° C. instead of the 400° C. or greater heating steps required by conventional processes.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

Example 1

PRIMACOR™ 5980, an ethylene acrylic acid copolymer commercially available from SK Global Chemical Co., LTD, was neutralized at 60 mol % by mixing the ethylene acrylic acid copolymer with triethanolamine (TEA) using the procedures described in U.S. Pat. No. 3,389,109, U.S. Pat. No. 5,206,279, and U.S. Pat. No. 5,387,635, the entire contents of which are hereby incorporated by reference. The resulting aqueous dispersion had a solids content of 24%, a pH of 7.79, and an average dispersion particle size of 18.5 nm.

A molar excess of an aqueous solution of calcium chloride (40 wt %) was added to the aqueous dispersion with mixing at room temperature. A white precipitate was generated. The aqueous phase was collected for further analysis. The white precipitate was filtered via vacuum and deionized (DI) water was used to wash the precipitate to remove excess calcium chloride and potentially TEA (as a hydrochloride salt) from the precipitate. The washed precipitate was then collected and dried overnight in an oven at 60° C. The final dried, white solid was analyzed using various analytical techniques.

A comparative example was prepared by mixing PRIMACOR™ 5980 with a molar excess of an aqueous solution of calcium chloride, without neutralizing the EAA with an amine, or forming an aqueous dispersion. The EAA remained a solid pellet and did not react with the calcium chloride. Another comparative example was prepared by mixing PRIMACOR™ 5980 with TEA and calcium chloride in a single step. No uniform product was obtained for the comparative examples, and amine was present in the final product as a neutralization agent interacting with the acid.

Figure 2:
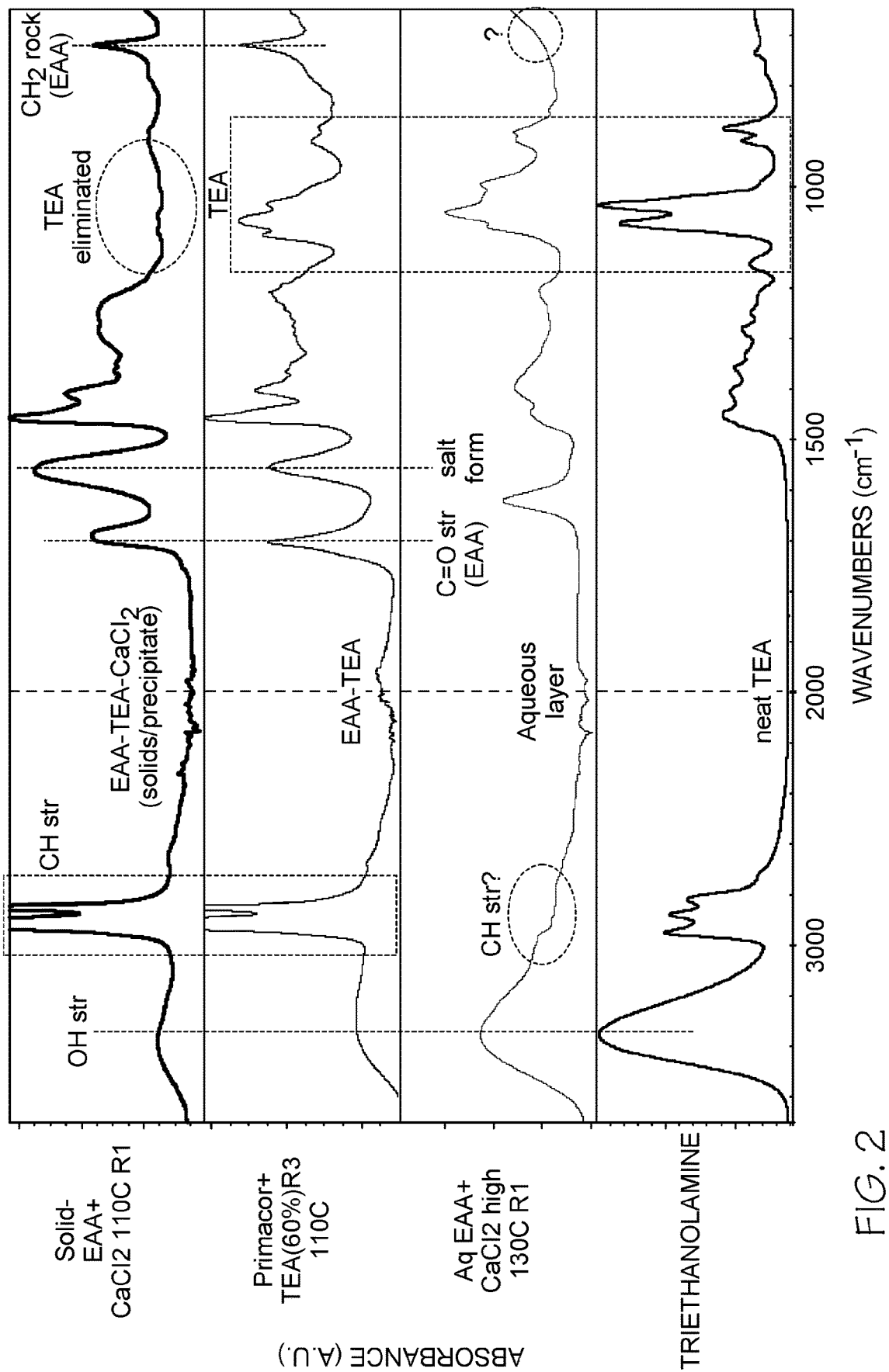
FIG. 2 is a graph of the FTIR analysis of the results of the reaction of Example 1.

In particular, infrared spectroscopy characterization and X-ray fluorescence (XRF) were used to characterize both the solid and the aqueous layer of the reaction. A Nicolet FTIR spectrometer having a 2% error equipped with a single bounce DuraScope diamond PIKE ATR attachment was used to acquire the infrared spectra. The proposed reaction route is depicted in FIG. 1. The FTIR results of the products are shown in FIG. 2.

Based on the FTIR spectra, the aqueous layer showed strong evidence of TEA, and the solids showed strong evidence of the salt form ($COO^-$) of the amine-neutralized ethylene acrylic acid ionomer, but no evidence of TEA. This analysis suggests the formation of $EAA-TEA-CaCl_2$. Further evidence was the observance of a peak around 1560 $cm^{-1}$, which is indicative of the salt form ($COO^-$) of a carboxylic acid as the $Ca^{2+}$ salt.

XRF analysis was performed using an Axios mAX advanced X-ray fluorescence spectrometer from Malvern Panalytical. The XRF analysis of the solid is provided in Table 1 below.

TABLE 1

| Sample | Ca (wt %) | Cl (wt %) |
|---|---|---|
| Solids | 8.5 | 0.98 |

The XRF data in Table 1 shows that the solid contained calcium with a ratio of calcium to chlorine of 9:1, indicating the presence of a $Ca^{2+}$ ion complex with EAA with a minor amount of $CaCl_2$ or the hydrochloride salt of TEA as an impurity.

Various embodiments describe methods of making metal ionomers that are suitable for use in a wide variety of applications. Such applications may include, by way of example and not limitation, golf balls, optical and/or medical devices such as eye contacts, and packaging, such as cosmetic and food packaging. In particular, the various embodiments described herein can enable metal ionomers having an increased amount of metal incorporated into the copolymer, which can in turn provide increased water proofing, mechanical properties, and adhesion properties.

It is further noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

The invention claimed is:

1. A method of making a metal ionomer, the method comprising:
    mixing an acid copolymer formed from an a-olefin monomer and an α,β-ethylenically unsaturated carboxylic acid with an aqueous solution comprising an amine-containing neutralizing agent, wherein the mixing produces an aqueous dispersion comprising an amine-neutralized ionomer having at least 20 mol % of carboxylic acid groups neutralized by the amine-containing neutralizing agent; and
    mixing Group IIA, Group IIIA, or transition metal salt with the aqueous dispersion comprising the amine-neutralized ionomer to at least partially ion exchange the amine for the Group IIA, Group IIIA, or transition metal salt, thereby forming the metal ionomer within the aqueous dispersion,
    wherein the amine-containing neutralizing agent is selected from monoethanolamine (MEA), diethanolamine (DEA), triethanolamine (TEA), dimethylaminoethanol (DMEA), or a mixture thereof.

2. The method of claim 1, wherein the acid copolymer comprises at least 50 mol % of the a-olefin, wherein the a-olefin is ethylene.

3. The method of claim 1, wherein from 10 mol % to 100 mol % of the amine is ion exchanged for the Group IIA or Group IIIA metal salt.

4. The method of claim 1, wherein the metal of the Group IIA or Group IIIA metal salt is selected from the group consisting of magnesium, calcium, barium, zinc, and aluminum.

5. The method of claim 1, wherein at least 50 mol % of the carboxylic acid groups of the acid copolymer are neutralized by the amine-containing neutralizing agent.

6. The method of claim 1, wherein the α,β-ethylenically unsaturated carboxylic acid has between 3 and 8 carbon atoms.

7. The method of claim 6, wherein the α,β-ethylenically unsaturated carboxylic acid is acrylic acid, methacrylic acid, itaconic acid, crotonic acid, maleic acid, or fumaric acid.

8. The method of claim 1, wherein the acid copolymer is ethylene (meth)acrylic acid.

9. The method of claim 6, wherein the acid copolymer is ethylene (meth)acrylic acid.

* * * * *